Oct. 12, 1954 J. S. ASTIN ET AL 2,691,713
SWITCHGEAR SHUTTER MECHANISM
Filed Feb. 23, 1951 3 Sheets-Sheet 1

WITNESSES:
INVENTORS
James S. Astin and
Frank L. McAdams.
BY
ATTORNEY

Oct. 12, 1954

J. S. ASTIN ET AL 2,691,713

SWITCHGEAR SHUTTER MECHANISM

Filed Feb. 23, 1951

WITNESSES:

INVENTORS
James S. Astin and
Frank L. McAdams.
BY
ATTORNEY

Patented Oct. 12, 1954

2,691,713

UNITED STATES PATENT OFFICE 2,691,713

SWITCHGEAR SHUTTER MECHANISM

James S. Astin, Palo Alto, and Frank L. McAdams, Sunnyvale, Calif., assignors to Westinghouse Electric Corporation, East Pittsburgh, Pa., a corporation of Pennsylvania Application February 23, 1951, Serial No. 212,396

7 Claims. (Cl. 200—168)

1

Our invention relates, generally, to metal-clad switchgear and, more particularly, to shutter mechanisms for metal-clad switchgear having circuit breakers of the drawout type disposed in metal housings or cubicles.

In switchgear of the drawout type, the primary disconnect contacts of the circuit breaker are mounted on insulating bushings which are inserted into insulating tubes mounted in the switchgear cubicle. A shutter, which is a device usually made of sheet metal, closes the openings to the insulating tubes when the breaker is removed from the operating position. Prior mechanisms for actuating the shutters have been complicated in structure and difficult to adjust to secure the proper operation of the shutter.

An object of our invention, generally stated, is to provide a shutter actuating mechanism which shall be simple and efficient in operation and which may be economically manufactured and installed.

A more specific object of our invention is to provide for readily adjusting a shutter-actuating mechanism after it has been assembled.

Another object of our invention is to provide a shutter-actuating mechanism which is positive in operation during both opening and closing of the shutter.

Other objects of our invention will be explained fully hereinafter or will be apparent to those skilled in the art.

In accordance with one embodiment of our invention, the shutter for a metal-clad switchgear unit of the vertical-lift type is actuated by a bell-crank lever mounted in the cell with one arm engaging the shutter and the other arm disposed to be engaged by a screw which is disposed in an extension of the elevating mechanism for the circuit breaker. The screw may be so adjusted that the shutter is closed during the latter part of the downward travel of the breaker and opened by a spring during the early part of the upward travel of the breaker.

For a better understanding of the nature and objects of our invention, reference may be had to the following detailed description, taken in conjunction with the accompanying drawings, in which.

2

Figure 1:
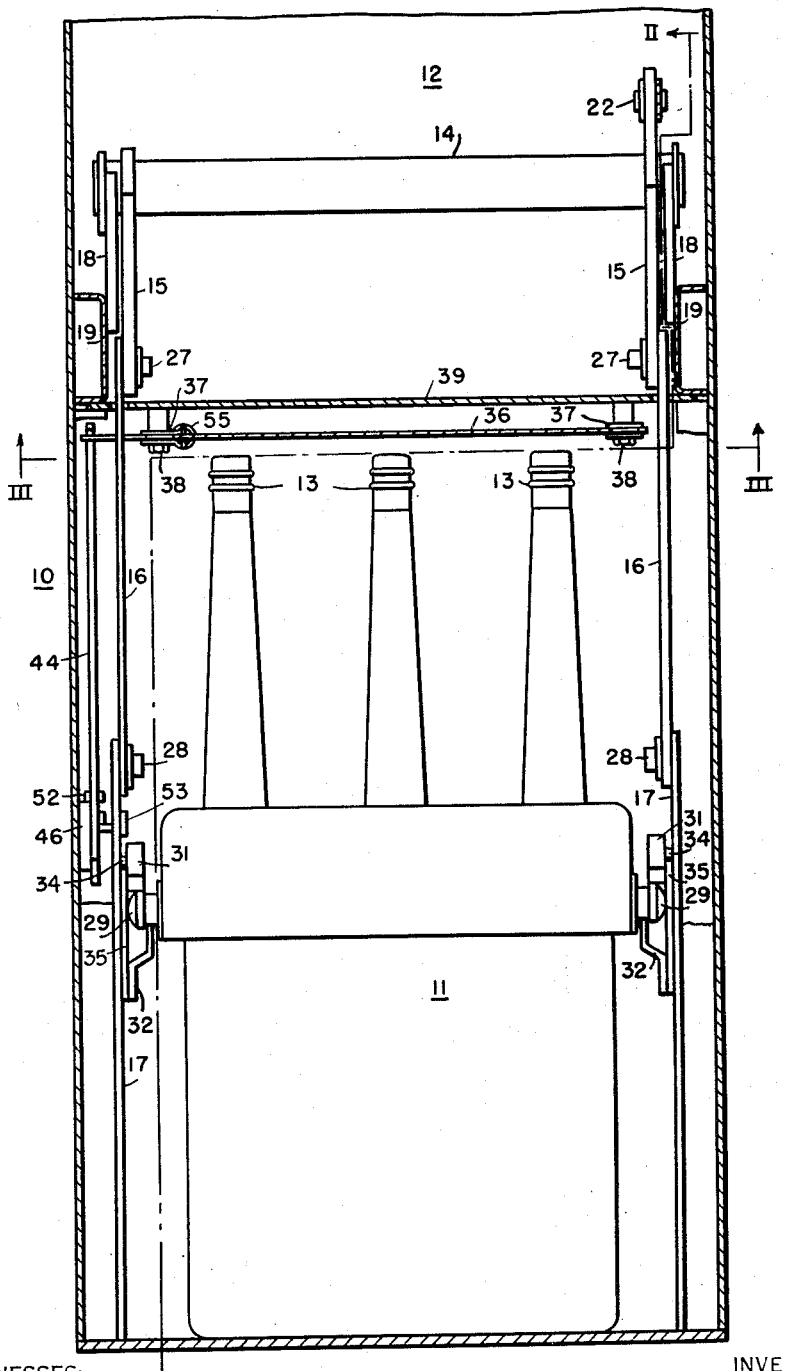
Figure 1 is a view, partly in front elevation and partly in section, of a portion of a metal-clad switchgear unit embodying the principal features of the invention.

Referring to the drawings, and particularly to Fig. 1, the structure shown therein comprises a metal cell or housing 10 of a type usually provided for housing a removable circuit breaker unit 11. A superstructure 12 is provided at the top of the cell 10 in which power conductors (not shown) may be disposed for connection to the circuit breaker 11 through primary disconnect contacts which may be of the usual type having stationary contact members (not shown) mounted in the superstructure 12 and movable contacts 13 carried by the circuit breaker 11.

In accordance with the usual practice, the circuit breaker unit 11 may be raised vertically in the cell by an elevating device which may be of the type described in Patent 2,276,653, issued March 17, 1942, to B. I. Hayford and A. L. Fletcher. The breaker unit is raised from the position shown in Fig. 1 to the operating position in which the primary disconnect contacts 13 engage the primary disconnect contacts in the superstructure 12, thereby connecting the circuit breaker to the power conductors in the superstructure.

Figure 2:
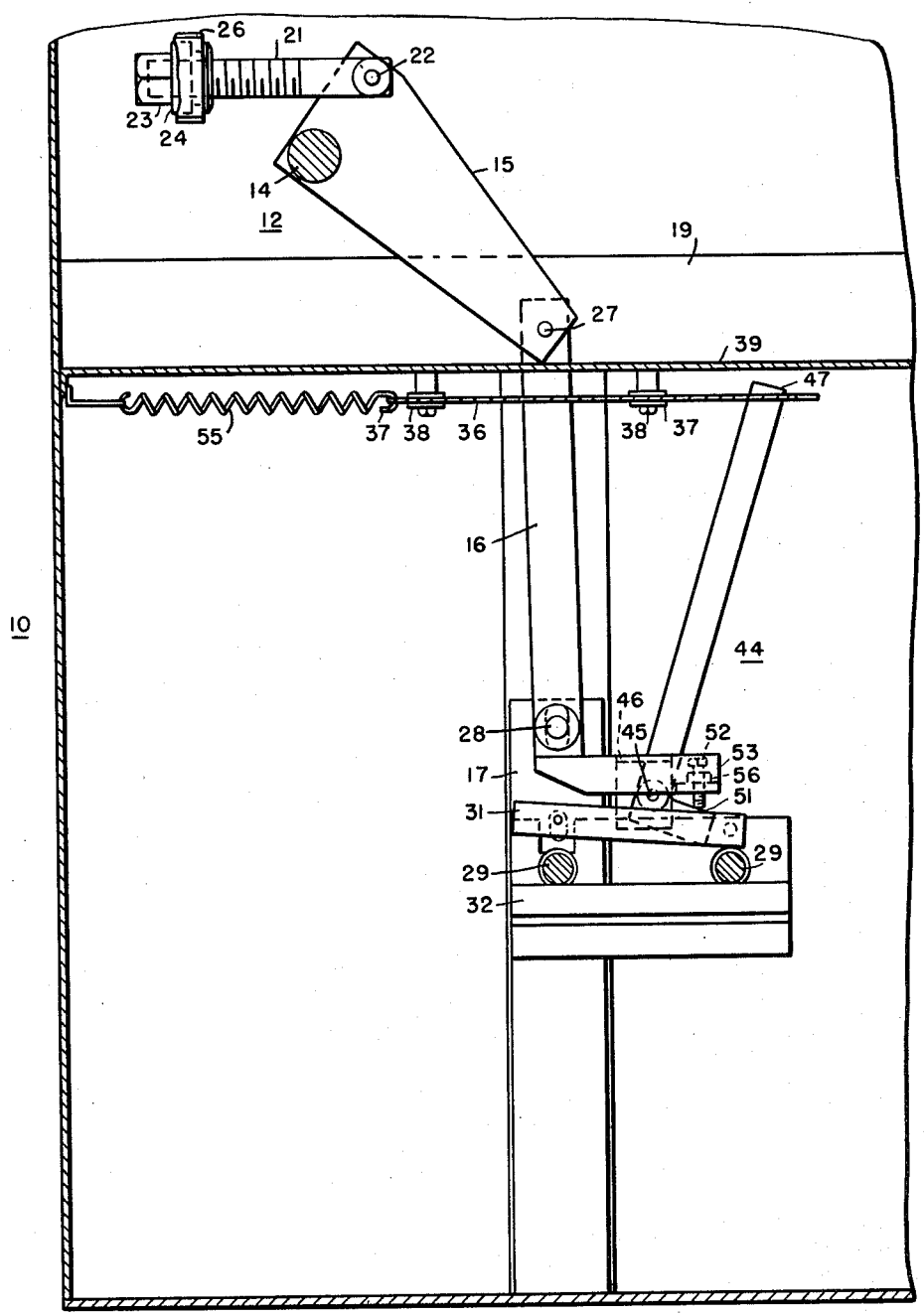
Fig. 2 is a view, in section, taken along the line II—II in Fig. 1.

As shown more clearly in Figs. 1 and 2, the elevating device comprises a shaft 14 with two crank arms 15 connected by links 16 to elevating members 17, one of which is disposed at each side of the cell 10. The ends of the shaft 14 are rotatably mounted in bearing plates 18 which are secured to channel members 19 on the sides of the housing 10. One of the crank arms 15 is connected to a screw 21 by means of a pin 22. The screw 21 extends through a nut 23 which is so disposed in a thrust bearing 24 that the shaft 14 is rotated when the nut 23 is turned by means of a socket wrench (not shown) which may be placed on the nut 23. The thrust bearing 24 may be mounted in an angle member 26 which is attached to the housing 10. The crank arms 15 are connected to the links 16 by pins 27. The lower ends of the links 16 are connected to the elevating device 17 by pins 28.

The breaker unit 11 has two lugs or studs 29 on each side which are engaged by the elevating device 17 to raise the breaker to the operating position. The supporting studs 29 enter between two members 31 and 32 carried by each one of the elevating members 17 disposed at each side of the breaker. The upper members 31 are hinged at the rear to permit their front end to swing upwardly for clearance when the breaker enters the housing.

As shown in Fig. 2, the hinges at the rear of the bars 31 have close clearance which prevents rocking of the breaker unit when the breaker mechanism is being operated. As described in the aforesaid patent, the upper members 31 are engaged by stop means in the cell to close the hinge members or bars 31 against the front studs 29 on the breaker when it is in the raised position, thereby rigidly supporting the breaker unit. When the elevating device is in the lowered position, a pin 34 in each one of the hinged members 31 engages a stop 35 in the housing to raise the hinge member to provide a wide opening for the studs 29 on the breaker.

Figure 3:
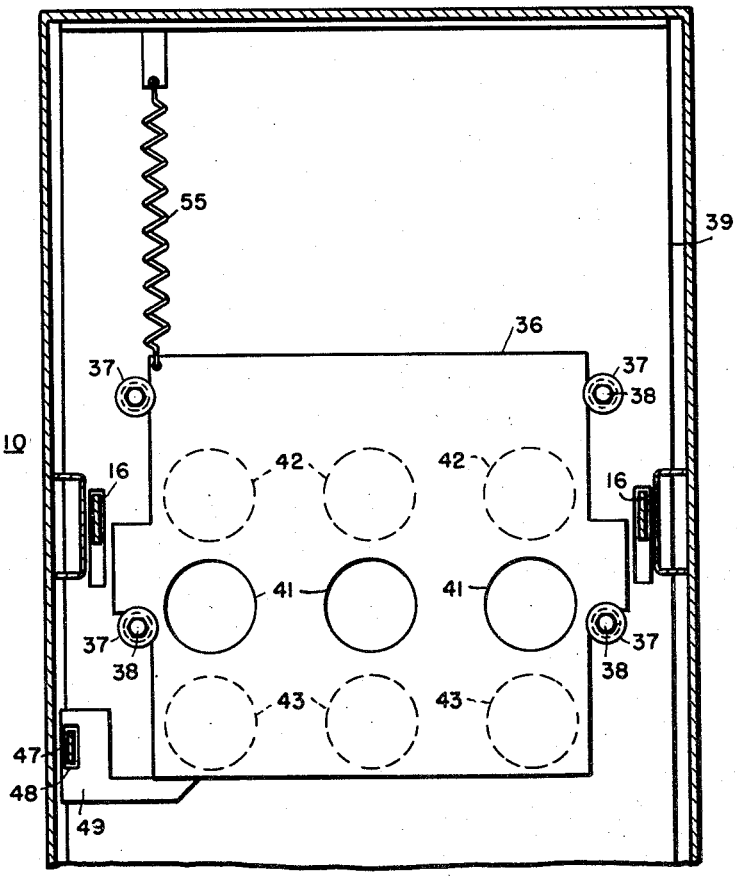
Fig. 3 is a view, in section, taken along the line III—III in Fig. 1.

In accordance with the usual practice, a shutter 36 is provided to prevent a person who may be working in the cell 10, when the breaker unit 11 is removed from the cell, from coming in contact with the primary disconnect contacts located in the superstructure. As shown most clearly in Fig. 3, the shutter 36 comprises a metal plate which is supported by grooved rollers 37 mounted on bolts 38 which may be threaded into a bottom plate 39 of the superstructure 12. The shutter 36 is provided with three openings 41 which are in alignment with openings 42 in the plate 39 for three of the primary disconnect contacts on the circuit breaker unit. Similar openings 43 in the bottom plate 39 are uncovered by the shutter 36 when the shutter is actuated to its open position.

In order to actuate the shutter to its closed position when the breaker unit 11 is lowered for removal from the cell 10, a bell-crank lever 44 is mounted on the left-hand side of the cell 10 by means of a pin 45 which is attached to a plate 46 secured to the side of the cell 10. The end of one arm 47 of the bell-crank lever 44 extends through a slot 48 in an angle-shaped member 49 which is attached to one corner of the shutter 36, as shown most clearly in Fig. 3. The other arm 51 of the bell-crank lever 44 is disposed to be engaged by a screw 52 which is threaded through an extension 53 secured to the lower end of the left-hand elevating link 16. The screw 52 may be so adjusted that it engages the arm 51 during the latter part of the downward travel of the circuit breaker unit, thereby operating the lever 44 to actuate the shutter 36 to its closed position by overcoming the tension of a spring 55 which normally biases the shutter 36 to its open position.

It will be understood that the ratio of the length of the arm 51 to the arm 47 of the bell-crank lever may be such that it is necessary for the screw 52 to engage the arm 51 only during a relatively small part of the downward travel of the circuit breaker in order for the arm 47 to close the shutter 36. Likewise, the shutter is permitted to open during the first part of the upward travel of the circuit breaker as the screw 52 is disengaged from the short arm 51 of the bell-crank lever.

The screw 52 may be readily adjusted after the elevating mechanism is completely assembled in order to secure the desired operation of the shutter. The screw may be retained in its adjusted position by means of a lock nut 56. If further adjustment is required because of wear of the operating parts, the adjustment may be readily made at any time. The arm 47 engages the shutter 36 with a sliding motion since the end of the arm 47 is disposed in the slot 48. Therefore, the operation of the shutter 36 is not affected by the fact that the end of the arm 47 moves in an arc when the bell-crank lever is operated.

From the foregoing description, it is apparent that we have provided a shutter actuating mechansim which is of a relatively simple construction and which may be readily adjusted to secure the proper operation of the shutter. Positive opening of the shutter is secured by a spring, and positive closing is secured by the bell-crank lever which is operated by the elevating mechanism for the circuit breaker.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In switchgear apparatus, in combination, a cell structure for housing a circuit breaker having primary disconnect contacts thereon, a mechanism for moving the entire breaker in the cell in a vertical plane, a shutter movable in the cell in a horizontal plane, a bell crank lever pivotally mounted in the cell with a relatively long arm engaging the shutter, said lever being entirely disconnected from the breaker and the primary disconnect contacts, and adjustable means disposed on said mechanism and movable therewith to releasably engage a relatively short arm of said lever to actuate said shutter during vertical movement of the entire breaker.

2. In switchgear apparatus, in combination, a cell structure for housing a circuit breaker having primary disconnect contacts thereon, a mechanism for moving the entire breaker in the cell in a vertical plane, a shutter movable in the cell in a horizontal plane, a bell-crank lever fulcrumed in the cell with a relatively long arm engaging the shutter, said lever being entirely disconnected from the breaker and the primary disconnect contacts, and actuating means disposed on said mechanism and movable therewith to releasably engage a relatively short arm of said lever to actuate said shutter during vertical movement of the entire breaker.

3. In switchgear apparatus, in combination, a cell structure for housing a circuit breaker having primary disconnect contacts thereon, a mechanism for moving the breaker in the cell in a vertical plane, a shutter movable in the cell in a horizontal plane, a bell-crank lever pivotally mounted in the cell with a relatively long arm engaging the shutter, said lever being entirely disconnected from the breaker and the primary disconnect contacts, and actuating means disposed on said mechanism to engage a relatively short arm of said lever to actuate said shutter during vertical movement of the breaker.

4. In switchgear apparatus, in combination, a cell structure for housing a circuit breaker having primary disconnect contacts thereon, a mechanism for moving the breaker in the cell in a vertical plane, a shutter movable in the cell in a horizontal plane, a bell-crank lever pivotally mounted in the cell with a relatively long arm slidably engaging the shutter, said lever being entirely disconnected from the breaker and the primary disconnect contacts, and actuating means carried by said mechanism and disposed to engage a relatively short arm of said lever to actuate said shutter during vertical movement of the breaker.

5. In switchgear apparatus, in combination, a cell structure for housing a circuit breaker having primary disconnect contacts thereon, link means for raising and lowering the breaker vertically, crank means connected to the link means for moving the link means vertically, a shutter movable in the cell horizontally, a bell-crank lever pivotally mounted in the cell with a relatively long arm engaging the shutter, and adjustable means carried by the link means and disposed to engage a relatively short arm of the lever to actuate the shutter during vertical movement of the breaker, said breaker and disconnect contacts being removable from the cell without disconnecting said link means and said lever.

6. In switchgear apparatus, in combination, a cell structure for housing a circuit breaker having primary disconnect contacts thereon, link means for raising and lowering the breaker vertically, actuating means connected to the link means for moving the link means vertically, a shutter movable in the cell horizontally, a bell-crank lever pivotally mounted in the cell with a relatively long arm slidably engaging the shutter, an extension secured to the link means, and a screw adjustably disposed in the extension to engage a relatively short arm of the lever to actuate the shutter during vertical movement of the breaker in one direction, said breaker and disconnect contacts being removable from the cell without disconnecting said link means and said lever.

7. In switchgear apparatus, in combination, a cell structure for housing a circuit breaker having primary disconnect contacts thereon, link means for raising and lowering the breaker vertically, actuating means connected to the link means for moving the link means vertically, a shutter movable in the cell horizontally, a bell-crank lever pivotally mounted in the cell with a relatively long arm slidably engaging the shutter, an extension secured to the link means, a screw adjustably disposed in the extension to engage a relatively short arm of the lever to actuate the shutter in one direction during vertical movement of the breaker in one direction, and a spring for actuating the shutter in the other direction during vertical movement of the breaker in the other direction, said breaker and disconnect contacts being removable from the cell without disconnecting said link means and said lever.

References Cited in the file of this patent

UNITED STATES PATENTS

| Number | Name | Date |
|---|---|---|
| 1,142,847 | Schildhauer | June 15, 1915 |
| 1,794,267 | Whitehead | Feb. 24, 1931 |